(12) United States Patent
Hsiao et al.

(10) Patent No.: US 12,241,844 B2
(45) Date of Patent: Mar. 4, 2025

(54) METHOD AND SYSTEM FOR DETECTING A DEFECT ON A SEMI-REFLECTIVE FILM BY ILLUMINATING DIFFERENT LIGHT SOURCES ALONG THE SAME OPTICAL AXIS

(71) Applicant: HUA YANG Precision Machinery Co., Ltd, Tainan (TW)

(72) Inventors: Hsien-Te Hsiao, Tainan (TW); Hsuan-Fu Wang, Tainan (TW)

(73) Assignee: HUA YANG Precision Machinery Co., Ltd, Tainan (TW)

(*) Notice: Subject to any disclaimer, the term of this patent is extended or adjusted under 35 U.S.C. 154(b) by 137 days.

(21) Appl. No.: 18/126,624

(22) Filed: Mar. 27, 2023

(65) Prior Publication Data
US 2024/0077425 A1 Mar. 7, 2024

(30) Foreign Application Priority Data
Sep. 6, 2022 (TW) .................................. 111133710

(51) Int. Cl.
*G01N 21/88* (2006.01)
*G01N 21/47* (2006.01)
(52) U.S. Cl.
CPC . *G01N 21/8806* (2013.01); *G01N 2021/4735* (2013.01); *G01N 2021/8848* (2013.01)

(58) Field of Classification Search
CPC ....... G01N 21/8806; G01N 2021/4735; G01N 2021/8848
See application file for complete search history.

(56) References Cited

FOREIGN PATENT DOCUMENTS

| JP | H1062354 A | * | 3/1998 | ............. G01N 21/88 |
|----|-----------|---|--------|------------------------|
| TW | I738788   |   | 9/2021 |                        |

* cited by examiner

*Primary Examiner* — Jamil Ahmed
(74) *Attorney, Agent, or Firm* — WPAT, PC

(57) ABSTRACT

A detection method and system for inspecting a defect on a semi-reflective film by way of different light sources illuminated on the semi-reflective film along the same axis. More specifically, a P-polarized light source and an S-polarized light source are used to illuminate the defect on the semi-reflective film, with an illumination direction that is between 5-45 degrees relative to the semi-reflective film. A camera module captures an image to be inspected through the phenomenon that the P-polarized light will partially pass through the semi-reflective film, and the S-polarized light will be almost completely reflected by the semi-reflective film. During the detection, the defect is determined to be located on the front surface of the semi-reflective film when the S-polarized light is present in the image, and the defect is determined to be located on the back surface of the semi-reflective film when the P-polarized light is present in the image and no S-polarized light has entered the camera module.

9 Claims, 14 Drawing Sheets

METHOD AND SYSTEM FOR DETECTING A DEFECT ON A SEMI-REFLECTIVE FILM BY ILLUMINATING DIFFERENT LIGHT SOURCES ALONG THE SAME OPTICAL AXIS

FIELD OF THE DISCLOSURE

The present disclosure is related to a defect detection technology in the semi-reflective film, and more specifically to a defect detection method and system that uses different light sources to illuminate the semi-reflective film along the same optical axis.

BACKGROUND OF THE DISCLOSURE

Taiwan Patent No. 1738788 (Application No. 106118010) discloses a detection system for a dark-field wafer nano-defect using a singularity beam. In this case, a singularity laser beam is used to irradiate a substrate, forming an illumination point on the substrate and a bright stripe on the surface of the substrate. This bright stripe extends from a portion of the illumination point, and a plurality of scattered light from the nano-defect located on the illumination point is detected by an optical detection system. By using the scattered light, the dark-field optical inspection method is employed to detect the nano-defect.

However, this technique can only detect one or more defects at the nanometer level, and cannot determine whether the defect is located on the front or back of the substrate. Therefore, it is not suitable for detecting the defect on the semi-reflective film. For example, in the protective film of a photomask, which is a type of semi-reflective film, it is important to determine whether the defect is located on the front surface or the back surface of the film. If the defect is on the front surface, it can be removed during cleaning of the front surface. However, if the defect is located on the back surface, it poses a different cleaning challenge. Therefore, determining the location of the defect on the front or back surface of the film is an important requirement for the production of the semi-reflective film. Currently, there is no known effective technique to detect whether the defect is located on the front or back surface of the film.

SUMMARY OF THE DISCLOSURE

It is therefore an object of the present disclosure to provide a defect detection method and system for a semi-reflective film by using different light sources to illuminate the semi-reflective film along the same axis in order to effectively detect one or more defects located on the front or back surface of the semi-reflective film.

To achieve the above-mentioned object, the present disclosure provides the defect detection method for the semi-reflective film irradiated by different light sources along the same optical axis, using the steps as discussed henceforth. Preparing step (A): preparing a semi-reflective film having an inspection surface, with multiple defects on the film whose coordinates on the film are known but whose location on the front surface or back surface of the semi-reflective film is unknown, preparing a P-polarized light source and an S-polarized light source, and illuminating the semi-reflective film along the same optical axis with the two sources, making the angle of incidence between the optical axis and the inspection surface from 5 to 45 degrees, and adjusting the angle of incidence based on the surface reflectivity of the semi-reflective film to ensure that the light emitted by the P-polarized light source penetrates the inspection surface by 30% or more, with the light emitted by the S-polarized light source penetrating the inspection surface by 10% or less. Illuminating and imaging step (B): illuminating and imaging each defect sequentially based on the known coordinates of each defect. When illuminating or irradiating the defect, the inspection surface is illuminated with P-polarized light from the P-polarized light source and S-polarized light from the S-polarized light source. When imaging the defect, a camera module is used to capture images under P-polarized and S-polarized light that are illuminated separately, with the camera module located on the normal line of the inspection surface and covering only the defect in question, excluding any other defect at different coordinates. The imaging range of the camera module must meet the following conditions: when there is no defect on the front or back surface of the semi-reflective film, the light reflected by the semi-reflective film under P-polarized and S-polarized light irradiation does not enter the camera module. Detecting and determining step (C): a computer executes an evaluation logic to determine the multiple images corresponding to the multiple defects. The evaluation logic includes the following procedures: for a given defect, if the corresponding images contain S-polarized light entering the camera module, then the defect is determined to be on the front surface of the semi-reflective film. If the corresponding images contain P-polarized light but no S-polarized light entering the camera module, then the defect is determined to be on the back surface of the semi-reflective film.

Using the aforementioned method, the present disclosure can effectively detect whether the defect is located on the front or back surface of the semi-reflective film during defect detection.

The present disclosure further provides a defect detection system for the semi-reflective film for which different light sources are used to illuminate the semi-reflective film along the same optical axis using the aforementioned steps, and further includes a movable inspection table for placing the semi-reflective film. More specifically, the semi-reflective film has an inspection surface and multiple defects, and the coordinates of the multiple defects on the semi-reflective film are stored in a computer. The movable inspection table can be controlled by the computer to move the semi-reflective film in the X and Y directions. A P-polarized light source and an S-polarized light source are each controlled by the computer to illuminate the inspection surface along the same optical axis, and to make the optical axis intersect the inspection surface at an angle of incidence of between 5-45 degrees. In particular, the P-polarized light emitted by the P-polarized light source penetrates the inspection surface by more than 30%, while the S-polarized light emitted by the S-polarized light source penetrates the inspection surface by less than 10%. A camera module located on the normal line of the inspection surface of the semi-reflective film. The camera module is controlled by the computer to capture images of each defect on the inspection surface, and obtain dual images for each defect to be evaluated. The imaging range of the camera module only covers one defect and does not include other aforementioned defects at different coordinate positions. The imaging range of the camera module must meet the following conditions: when there are no defects on the surface and back of the semi-reflective film, the light reflected by the semi-reflective film illuminated by the P-polarized light and the S-polarized light will not enter the camera module. The computer executes evaluation logic to determine the two images to be inspected. If the corresponding image has S-polarized light entering the camera module, then the defect is evaluated to be on the front surface of the semi-reflective film. If the corresponding image has P-polarized light but no S-polarized light entering the camera module, then the defect is evaluated to be on the back surface of the semi-reflective film.

In this way, the aforementioned method and system of the present disclosure can determine whether the defect is located on the front or back of a semi-reflective film.

Figure 1:
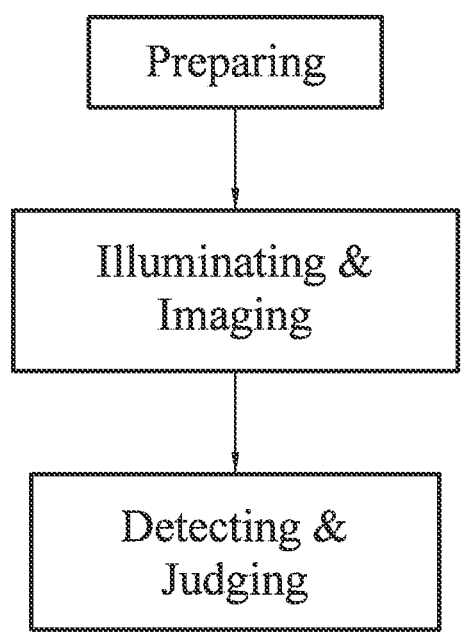
FIG. 1 is a flowchart of an exemplary embodiment of the present disclosure.
Figure 2:
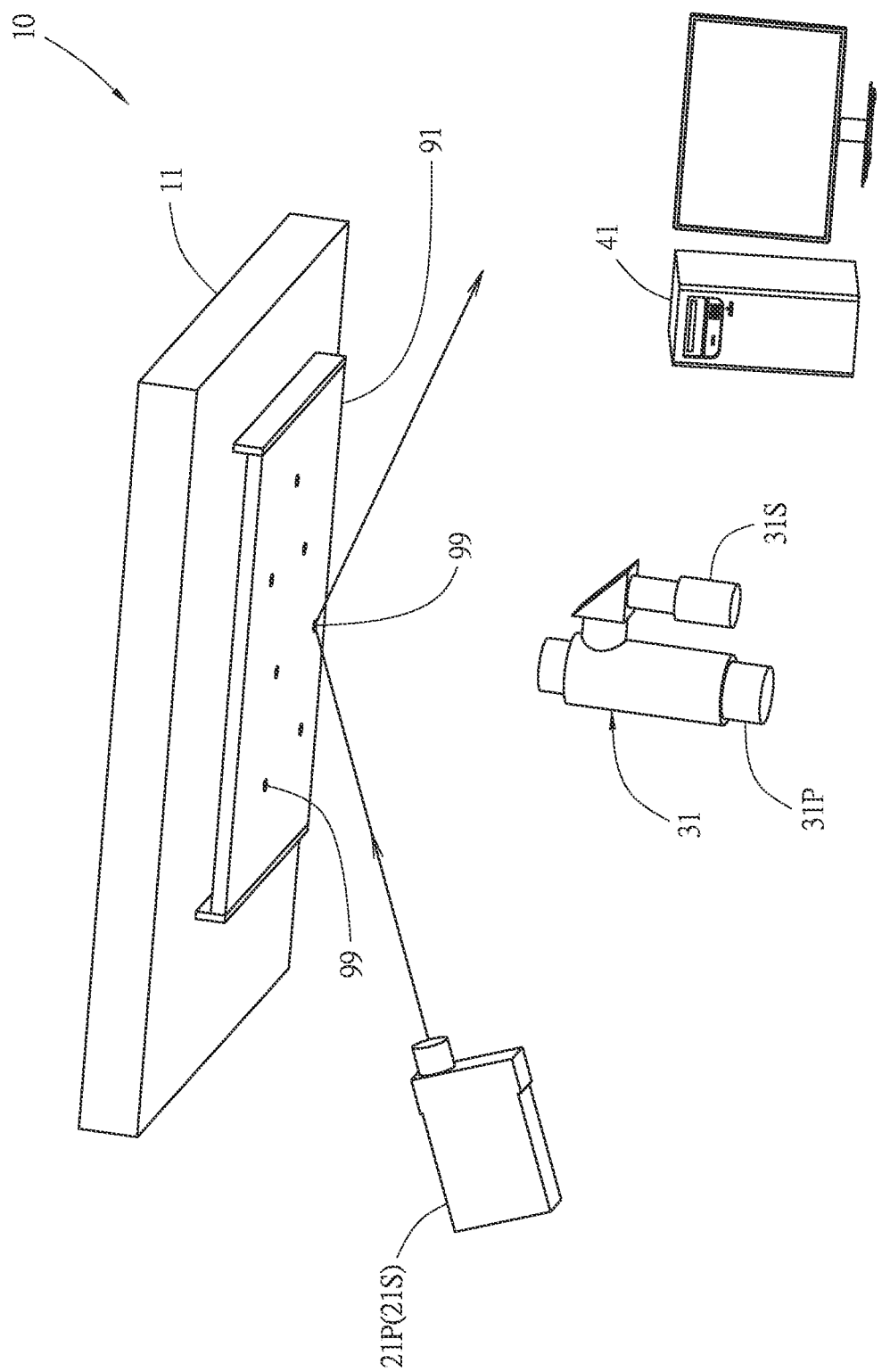
FIG. 2 is an illustrative diagram for the exemplary embodiment of the present disclosure.

In the various figures of the drawings, reference numbers are used to designate parts as follows: defect detection system 10; movable inspection platform 11; P-polarized light source 21P; S-polarized light source 21S; camera module 31; P-polarized camera 31P; S-polarized camera 31S; reflective mirror 32; semi-reflective mirror 34; filter module 35; captured image(s) 37; computer 41; evaluation logic 42; semi-reflective film 91; inspection surface 92; defect(s) 99; bright spot 99'; filter 351; optical axis A or A'; P-polarized light beam P; S-polarized light beam S; and illumination angle θ.

DETAILED DESCRIPTION OF THE EXEMPLARY EMBODIMENTS

In order to elaborate on the technical features of the present disclosure, the following exemplary embodiment will be given with reference to the accompanying drawings as follows:

As shown in FIGS. 1 to 13, the exemplary embodiment of the present disclosure provides a defect detection method for semi-reflective films that are illuminated by different light sources along the same optical axis. The method includes the steps as set forth below.

Figure 3:
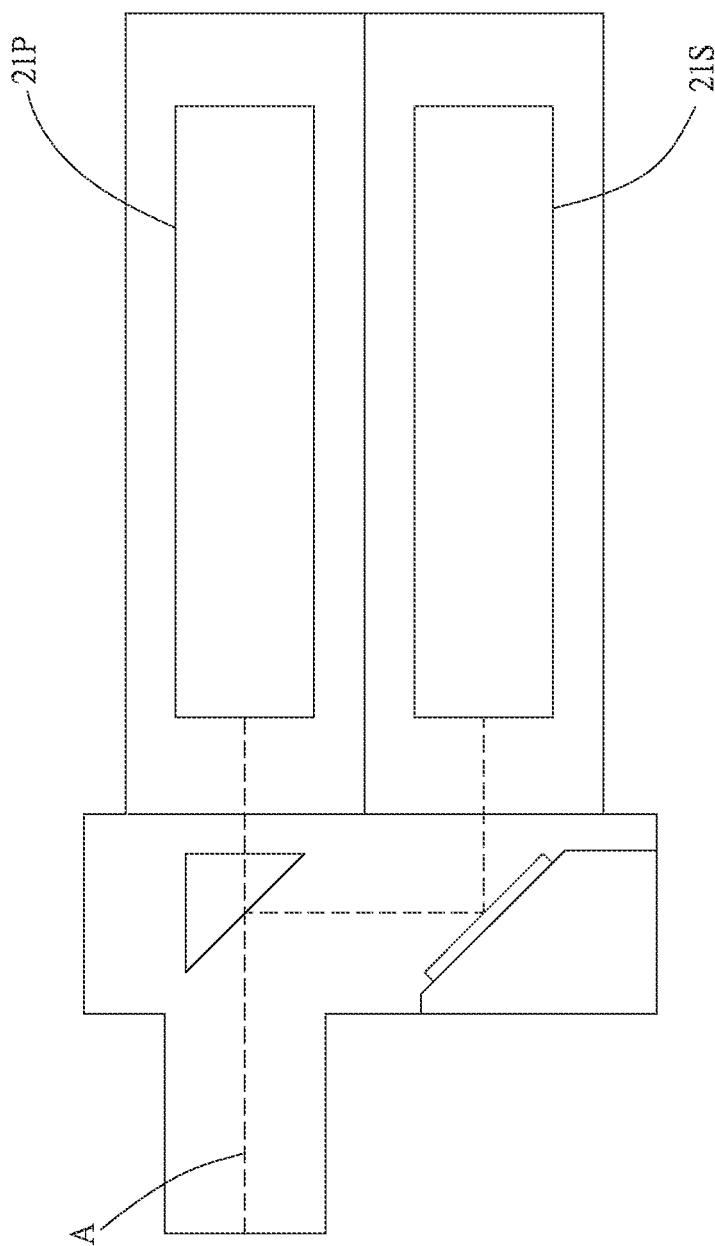
FIG. 3 is a schematic diagram of a structure showing a P-polarized light source and S-polarized light source according to the exemplary embodiment of the present disclosure.

Preparing step (A): semi-reflective film 91 is prepared in this embodiment, which is exemplified by a protective film of a photomask. The semi-reflective film 91 has an inspection surface 92 and a plurality of defects 99. The coordinates of the defects 99 are known, but whether the defects 99 are located on the front or back surface of the semi-reflective film is unknown. As shown in FIG. 3, a P-polarized light source 21P and an S-polarized light source 21S are prepared, and the inspection surface 92 is illuminated with the P-polarized light source 21P and the S-polarized light source 21S along the same optical axis A. The optical axis A and the inspection surface 92 form an illumination angle θ, which is preferably between 5 and 45 degrees based on the surface reflectivity of the semi-reflective film 91. In this embodiment, the illumination angle θ is set to 20 degrees. The P-polarized light beam P emitted by the P-polarized light source 21P penetrates the inspection surface 92 and enters the semi-reflective film 91 with a penetration rate of 30% or more, which is set to 50% in this embodiment. The S-polarized light beam S emitted by the S-polarized light source 21S has a penetration rate of 10% or less on the surface of the inspection surface 92, which is set to 5% in this embodiment, and the S-polarized light beam that is not transmitted is reflected by the inspection surface 92 or absorbed by the semi-reflective film 91. In this embodiment, a green laser is used as the P-polarized light source, and a blue laser is used as the S-polarized light source.

Figure 4:
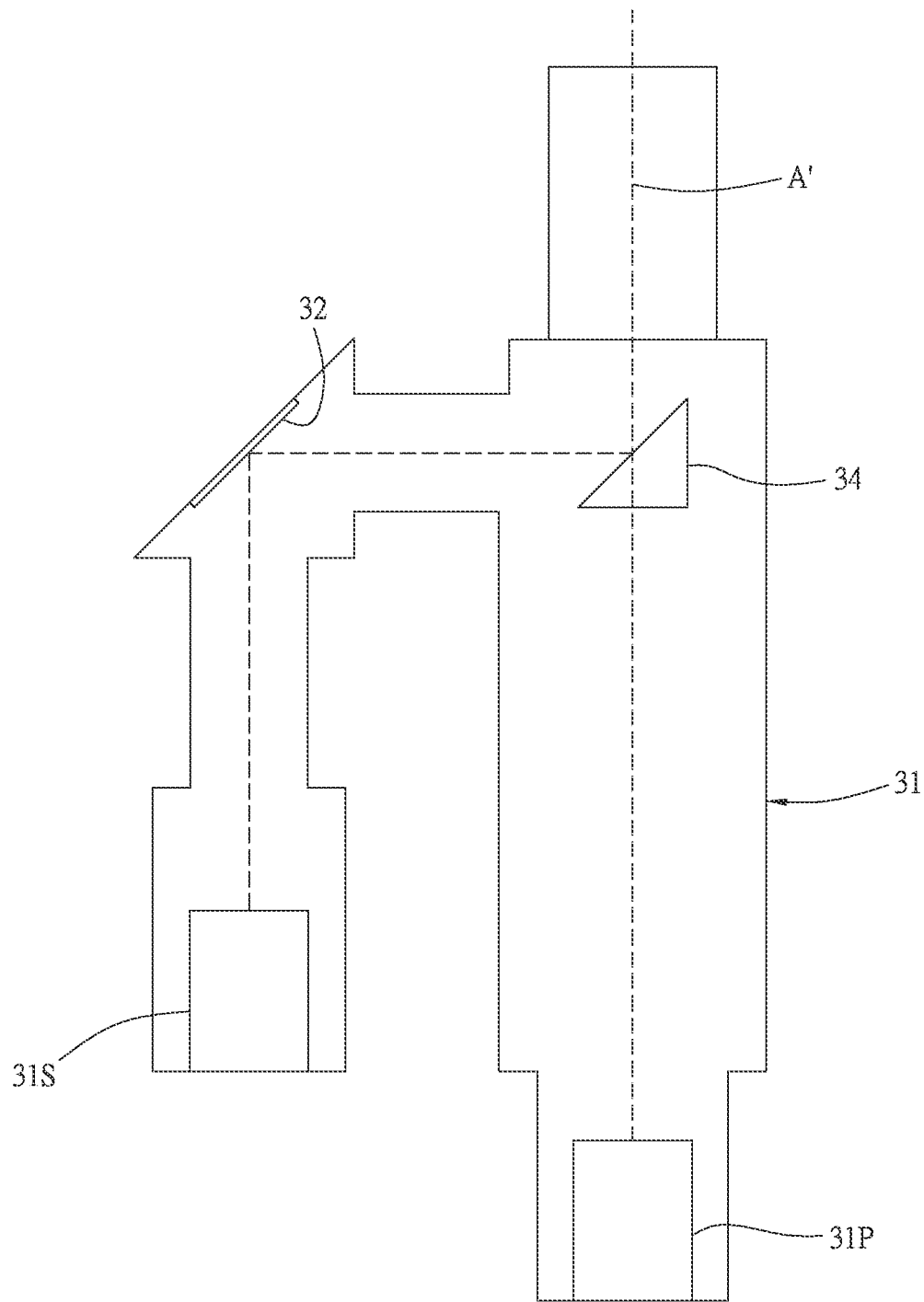
FIG. 4 is a schematic diagram of the camera module according to the exemplary embodiment of the present disclosure.

Illuminating and imaging step (B): The plurality of defects 99 are sequentially illuminated and imaged based on their coordinate positions. When illuminating one defect 99 at its coordinate position, the P-polarized light source 21P illuminates the inspection surface 92 with P-polarized light rays, and the S-polarized light source 21S illuminates the inspection surface 92 with S-polarized light rays. In this embodiment, the P-polarized light source 21P and the S-polarized light source 21S are illuminated separately and not simultaneously. Since the P-polarized light source 21P and the S-polarized light source 21S are irradiated onto the inspection surface 92 through the same optical axis A, the angles and positions of both on the inspection surface 92 are substantially the same. When imaging the defects 99, a camera module 31 takes images separately when illuminated by the P-polarized light source 21P and the S-polarized light source 21S, respectively, to obtain two captured images 37. The camera module 31 is positioned on the normal (not shown in the figure) of the inspection surface 92 of the semi-reflective film 91, i.e., vertically imaged. The imaging range of the camera module 31 only covers the defect 99 being inspected, and not the other defects 99 at different coordinate positions. The imaging range of the camera module 31 also needs to meet the following conditions: when there are no defects 99 on the front and back surface of the semi-reflective film 91, the light reflected by the semi-reflective film 91 from the P-polarized light rays and the S-polarized light rays will not enter the camera module 31. In this embodiment, the camera module 31 has a P-polarized camera 31P and an S-polarized camera 31S. The P-polarized camera 31P and the S-polarized camera 31S take images of the semi-reflective film 91 through the same optical axis A'. This imaging technique is mainly formed by the combination of a reflective mirror 32 and a semi-reflective mirror 34 as shown in FIG. 4. When imaging, the P-polarized camera 31P and the S-polarized camera 31S take images separately when illuminated by the P-polarized light source 21P and the S-polarized light source 21S, respectively, to obtain the two captured images 37 for evaluation.

Detecting and determining step (C): A computer 41 executes evaluation logic 42 to determine the corresponding plurality of defects 99 from the captured images 37. The content of the evaluation logic 42 is as follows: For any given one defect 99, if the captured images 37 corresponding to the defect 99 have a situation in which the S-polarized light enters the camera module 31, then the defect 99 is determined to be located on the front surface of the semi-reflective film 91. If the captured images 37 correspond to the defect 99 have the P-polarized light but not the S-polarized light entering the camera module 31, then the defect 99 is determined to be on the back surface of the semi-reflective membrane 91. In this case, the back of film refers to the back surface of the semi-reflective film 91.

The principles of the above-mentioned steps for the detecting whether the defect 99 is located on the front or back surface of the semi-reflective film 91 is discussed below.

Figure 5:
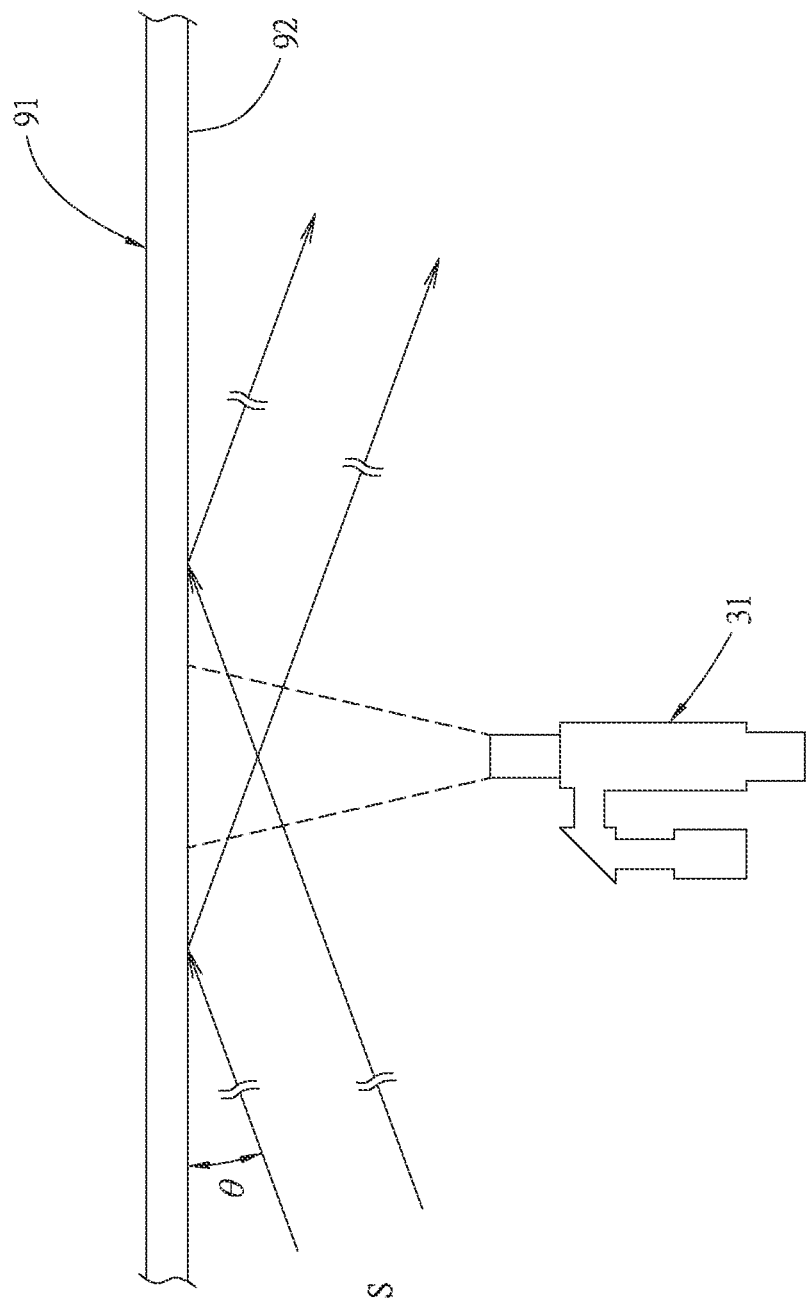
FIG. 5 is an illustrative diagram of the exemplary embodiment of the present disclosure, showing the state of illuminating the S-polarized light source when there is no defect located on the semi-reflective film.
Figure 6:
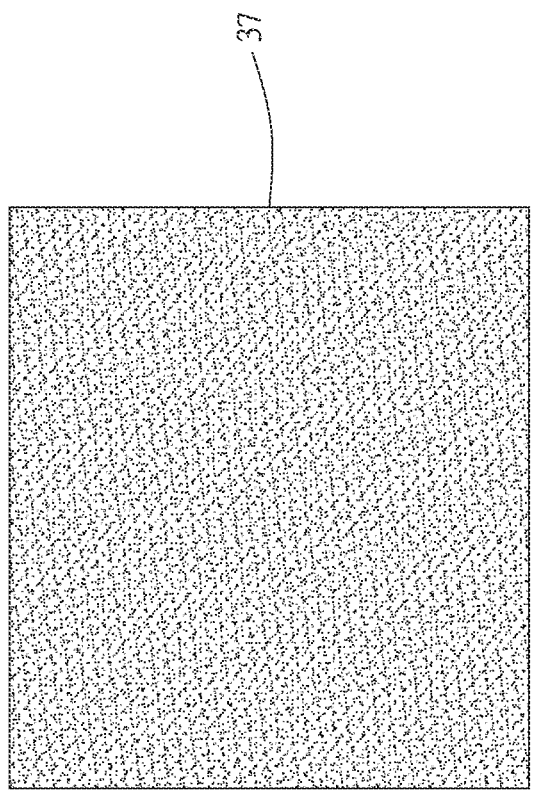
FIG. 6 is an illustration of a captured image according to the exemplary embodiment of the present disclosure.
Figure 7:
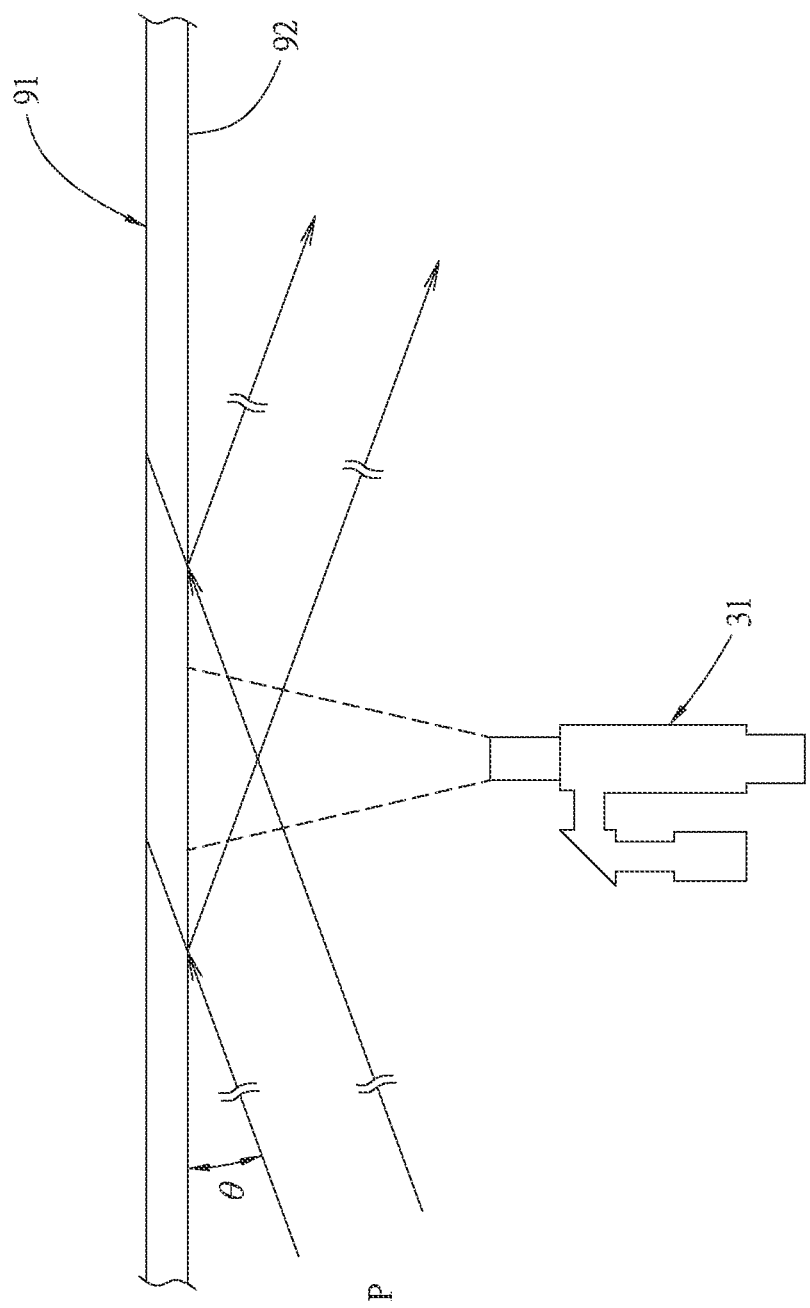
FIG. 7 is an illustrative diagram of the exemplary embodiment of the present disclosure, showing the state of illuminating the P-polarized light source when there is no defect located on the semi-reflective film.

As shown in FIG. 5, when there are no defects 99 on the inspection surface 92, under illumination of the S-polarized light, almost all the light is reflected from the inspection surface 92. Therefore, the S-polarized camera 31S does not capture any S-polarized light, and one of the captured images 37 for evaluation, as shown in FIG. 6, is a dark image without any light. For the sake of illustration, the entire image is displayed as a foggy point in FIG. 6. As shown in FIG. 7, even if 50% of the light penetrates the inspection surface 92 and enters the semi-reflective film 91 under illumination of P-polarized light, due to the absence of any defect 99, the P-polarized light reflected from the surface of the semi-reflective film 91 will not be captured by the P-polarized camera 31P. Therefore, the other one of the captured images 37 is also a dark image without any light.

Figure 8:
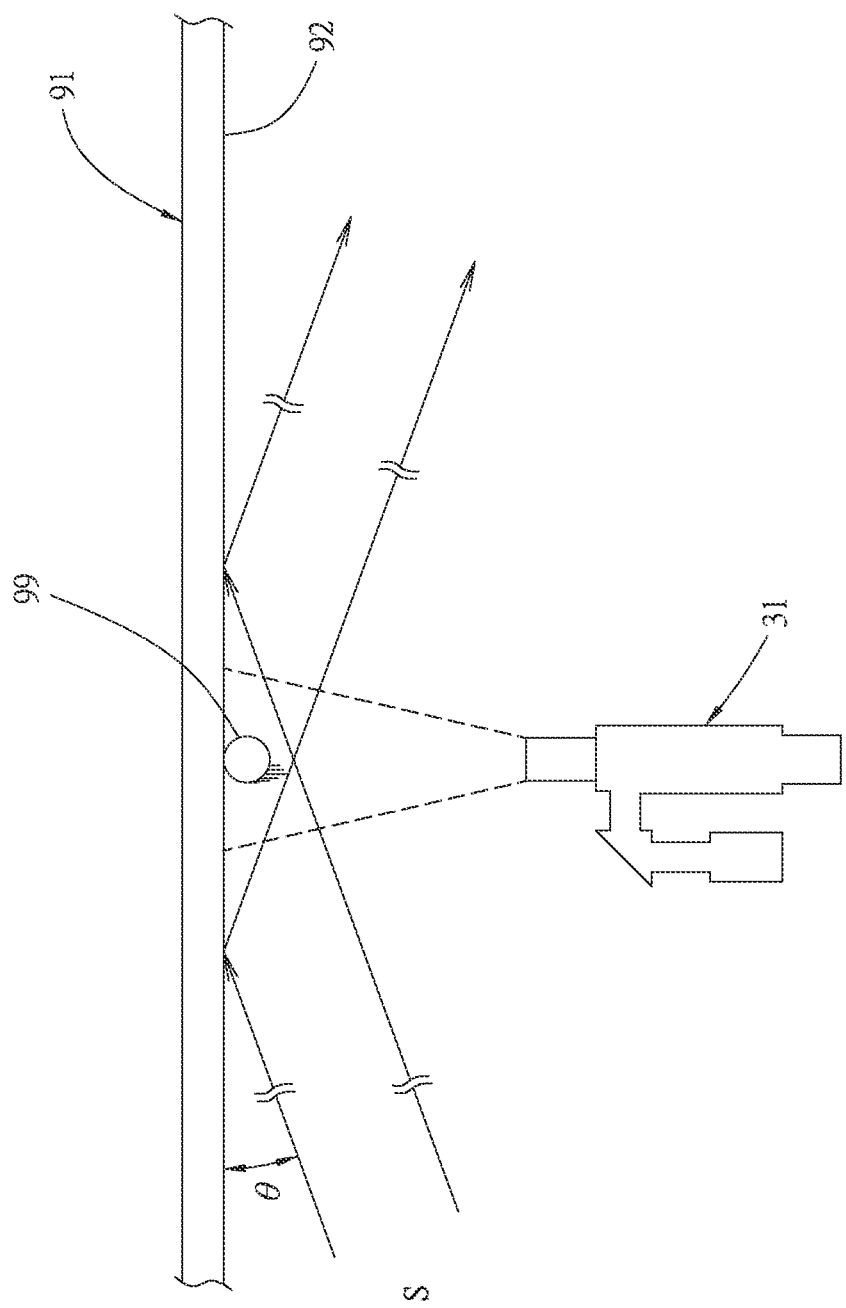
FIG. 8 is an illustrative diagram of the exemplary embodiment of the present disclosure, showing the state of illuminating the S-polarized light source when there is a defect located on a front surface of the semi-reflective film.
Figure 9:
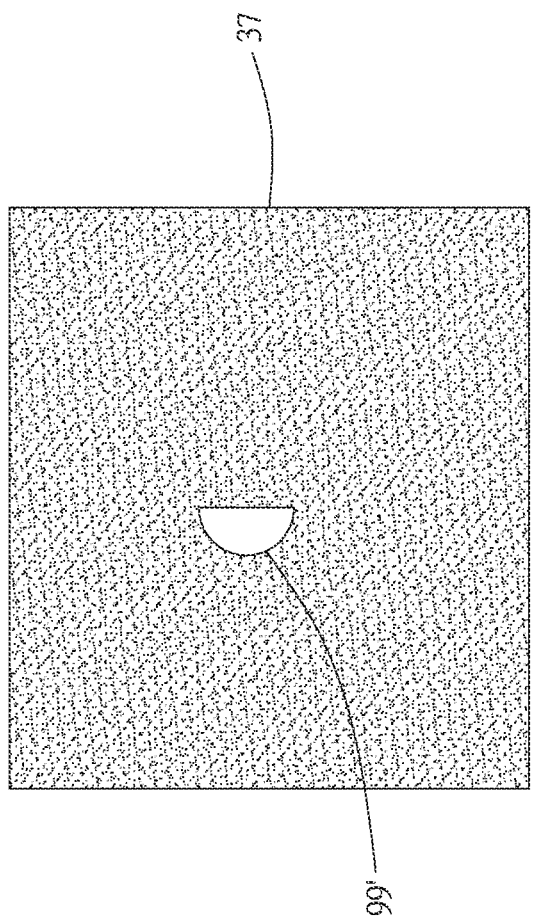
FIG. 9 is an illustration of another captured image according to the first exemplary embodiment of the present disclosure.
Figure 10:
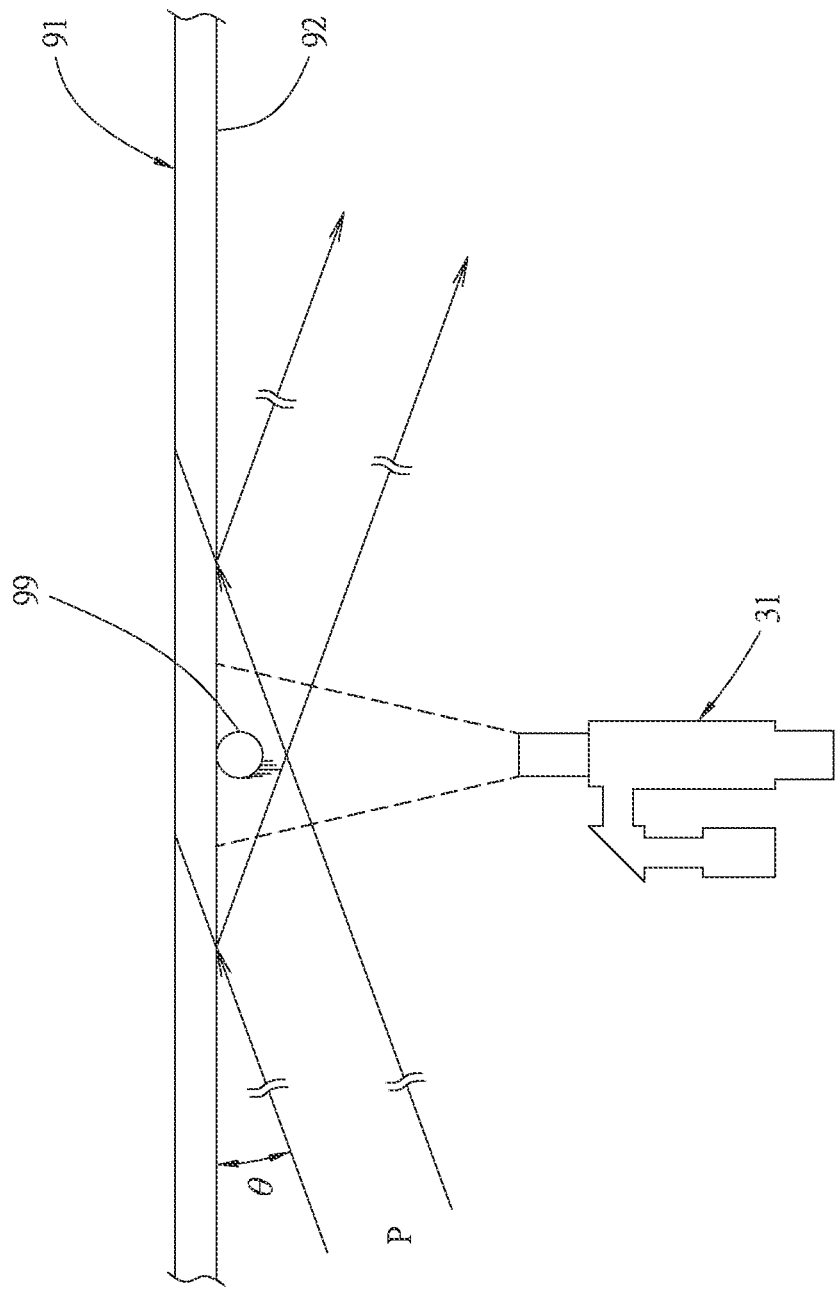
FIG. 10 is an illustrative diagram of the exemplary embodiment of the present disclosure, showing the state of illuminating the P-polarized light source when there is a defect located on a front surface of the semi-reflective film.

As shown in FIG. 8, when the defect 99 is present on the back (bottom) of the inspection surface 92 and illuminated by S-polarized light, scattering will occur due to the defect 99, and the scattered light is shown as multiple lines extending downward from the surface of the defect 99 in FIG. 8. Some S-polarized light will be captured by the scattered light, resulting in a bright spot 99' in the one of the captured images 37 of the S-polarized camera 31S, as shown in FIG. 9. The rest of the area outside the bright spot 99' appears dark. For convenience of illustration, the dark area is shown as a haze in FIG. 9. In this case, as shown in FIG. 10, when P-polarized light is used, scattering will also occur due to the defect 99, and the other one of the captured images 37 of the P-polarized camera 31P will also have the bright spot 99'. Therefore, if there is the bright spot 99' in the captured image 37 of the S-polarized camera 31S, then the defect 99 can be determined as located on the front surface of the semi-reflective film 91.

Figure 11:
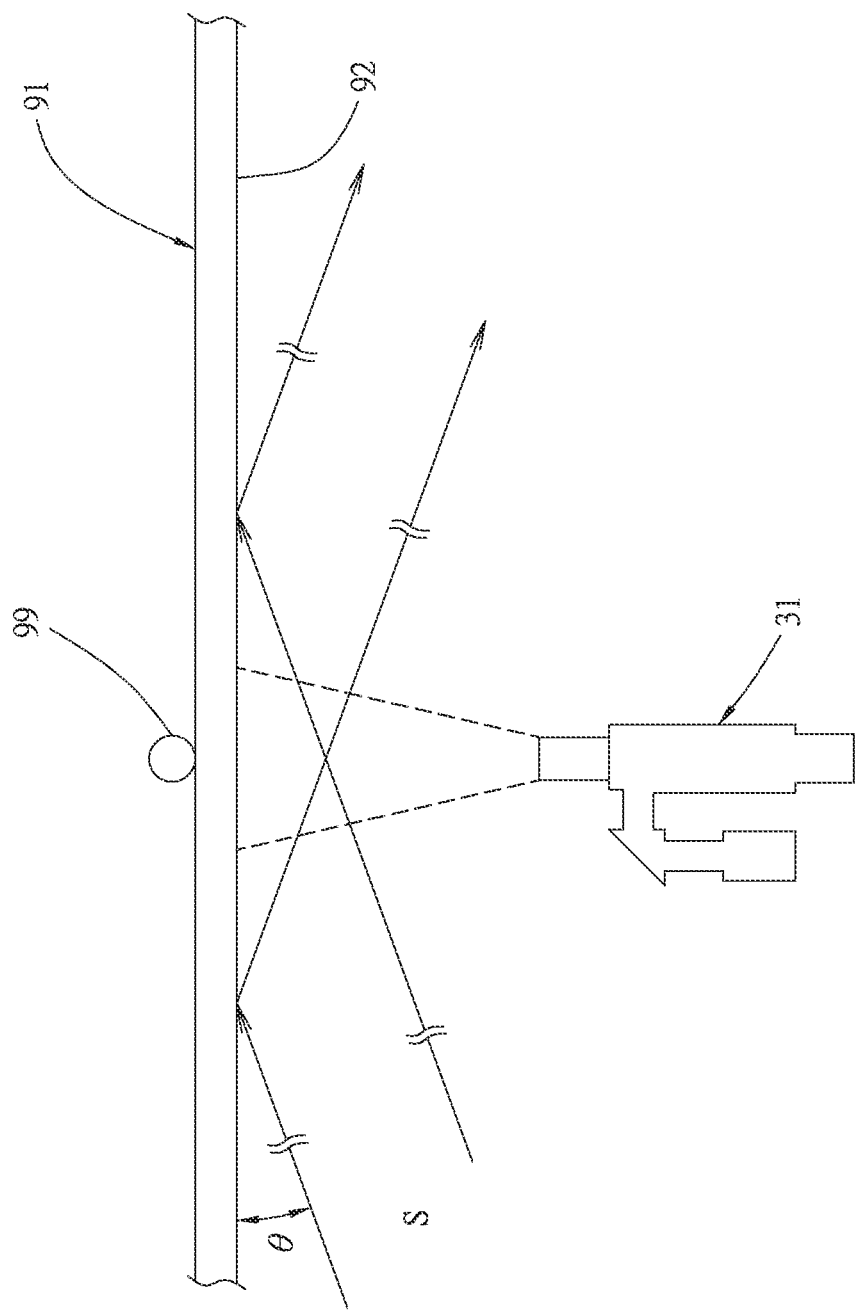
FIG. 11 an illustrative diagram of the exemplary embodiment of the present disclosure, showing the state of illuminating the S-polarized light source when there is a defect located on a back surface of the semi-reflective film.
Figure 12:
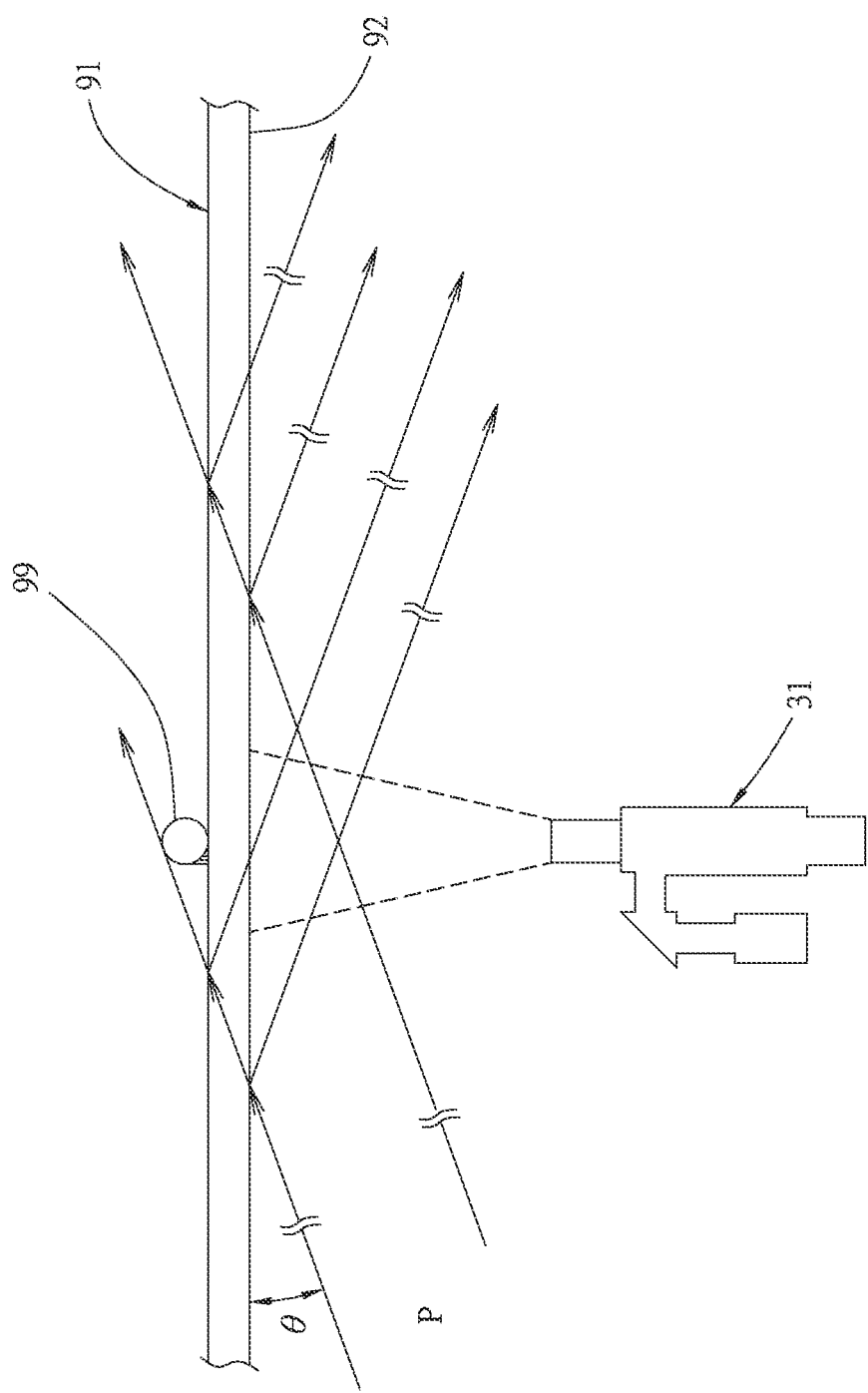
FIG. 12 an illustrative diagram of the exemplary embodiment of the present disclosure, showing the state of illuminating the P-polarized light source when there is a defect located on a back surface of the semi-reflective film.

As shown in FIG. 11, when there is a defect 99 located above the surface of the inspection surface 92, that is, located on the back side of the semi-reflective film, when illuminated by S-polarized light, only about 5% of the light can penetrate the inspection surface 92, and the rest is either reflected or absorbed. Therefore, the S-polarized camera 31S will not capture S-polarized light, and one of the captured images 37 will be a dark image without light similar to FIG. 6. As shown in FIG. 12, when the P-polarized light is illuminated, because 50% of the light passes through the inspection surface 92 and then passes through the bottom surface of the semi-reflective film 91, it will be illuminated on the defect 99 and cause scattering. The P-polarized camera 31P will capture the scattered light and cause the bright spot 99' to appear in the other one of the captured images 37, which is similar to FIG. 9. Therefore, it can be seen that there is no bright spot 99' in one of the captured images 37 obtained under S-polarized light illumination, and there is the bright spot 99' in the other one of the captured images 37 obtained under P-polarized light illumination. This can be used to determine whether the defect 99 is located on the back side of the semi-reflective film 91.

Through the above steps, the present disclosure can effectively detect the defect 99 that is located on the front or back surface of the semi-reflective film 91, thus achieving an effect that was previously unattainable by the conventional art.

Figure 13:
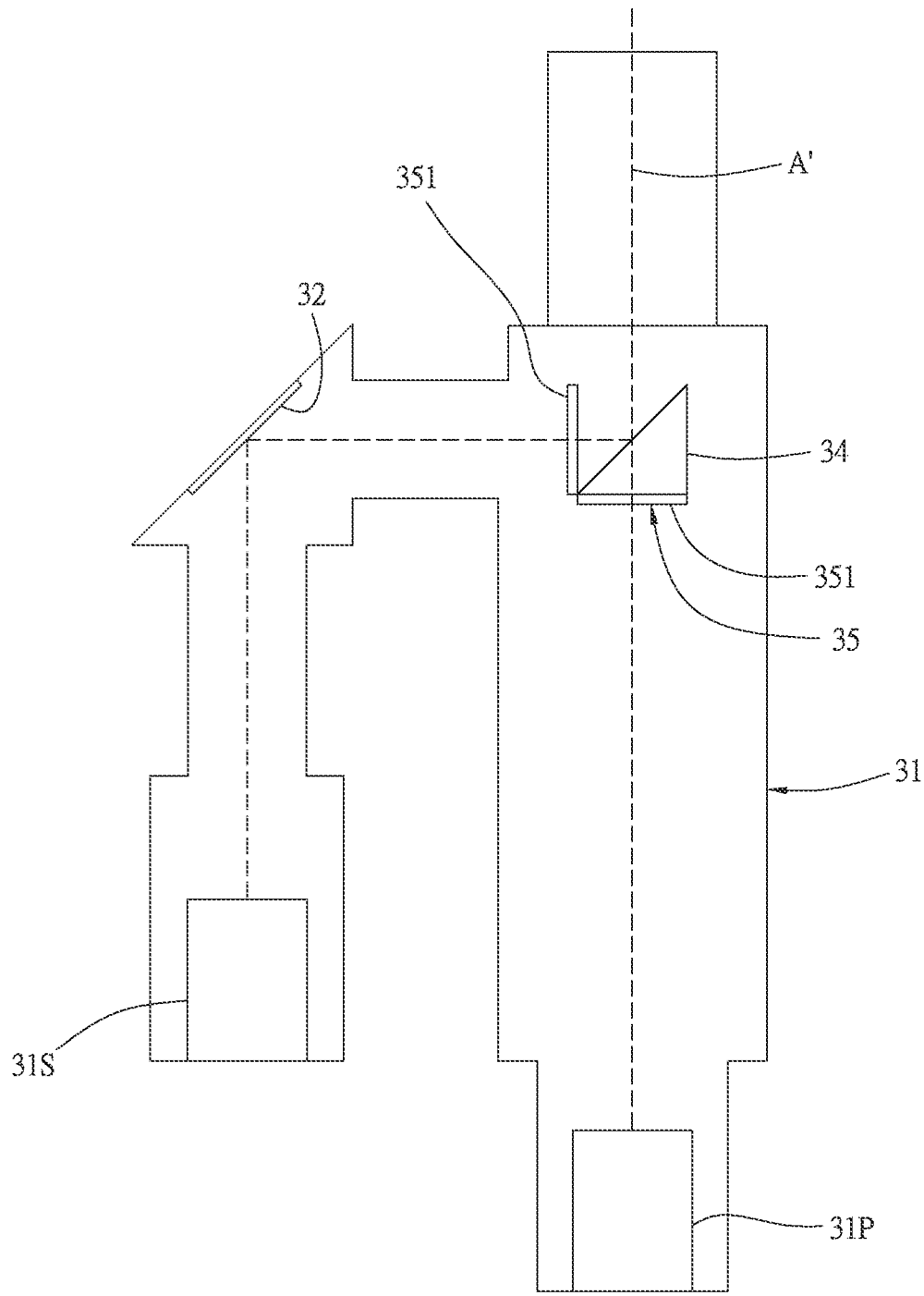
FIG. 13 is an illustration of a camera module of the exemplary embodiment of the present disclosure.
Figure 14:
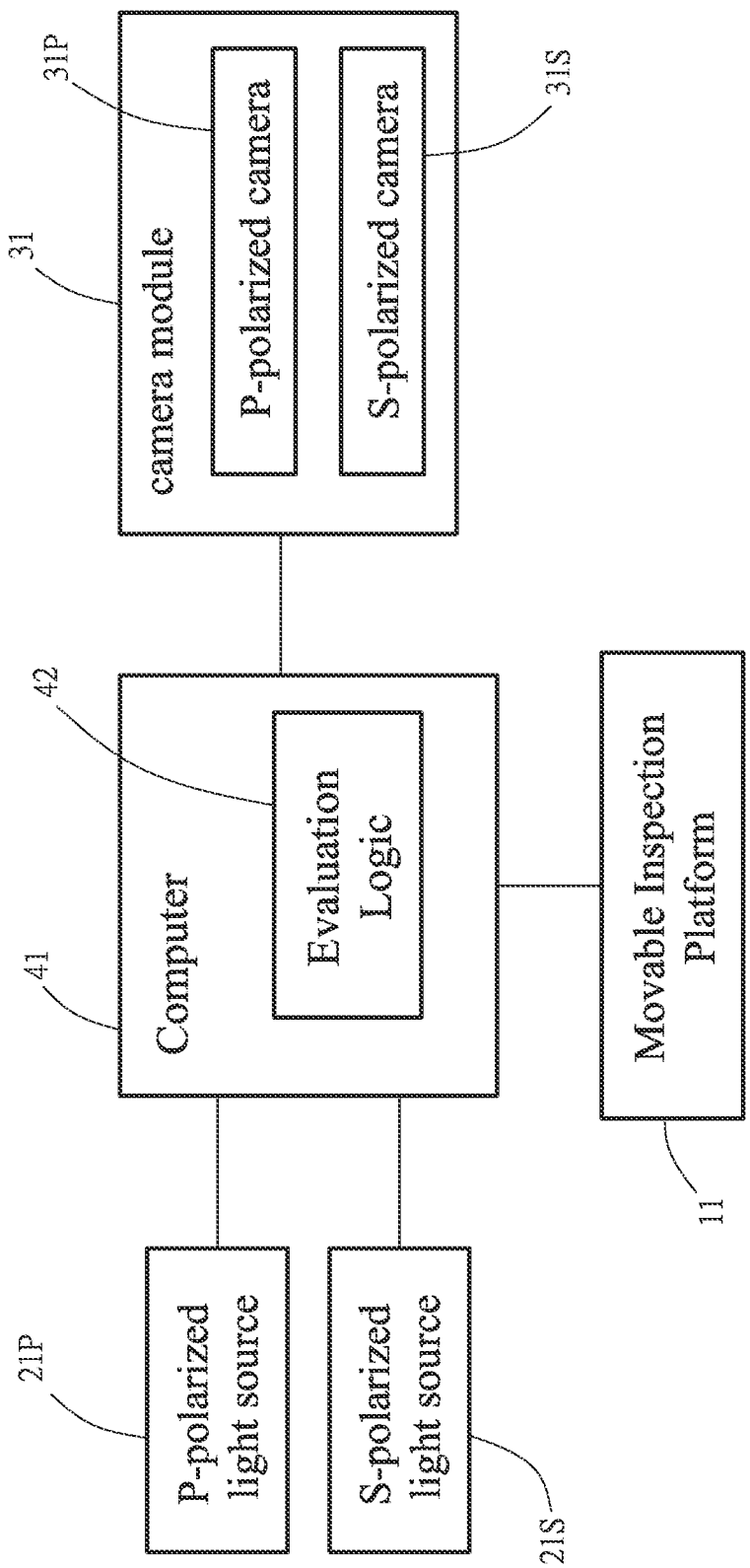
FIG. 14 is a schematic block diagram of the exemplary embodiment of the present disclosure.

It is worthwhile to add that, as shown in FIG. 13, the camera module 31 can also be provided with a filter module 35, and the P-polarized light source 21P and the S-polarized light source 21S can be used to illuminate the P-polarized light and the S-polarized light to the inspection surface 92 to be detected at the same time in the illuminating and imaging step (B) above. In this way, when P-polarized light or S-polarized light enters the camera module 31, the filter module 35 separates the P-polarized light from the P-polarized camera 31P and the S-polarized light from the S-polarized camera 31S, so that each of them can obtain an image to be evaluated for a total of two captured images 37. In practice, the filter module 35 can be constructed with two filters 351 and the aforementioned semi-reflective mirror 34, and can be assembled according to known optical technology, so its detailed structure is not described in detail here.

As shown in FIGS. 2 to 4 and FIG. 14, to perform the above-referenced steps, the following can be used: a defect detection system 10 that uses different light sources to illuminate the semi-reflective film along the same optical axis can be used. The defect detection system 10 mainly consists of a movable inspection platform 11, the aforementioned P-polarized light source 21P, the aforementioned S-polarized light source 21S, and the aforementioned camera module 31.

In particular, the movable inspection platform 11 is used to place the aforementioned semi-reflective film 91, which has an inspection surface 92 and multiple defects 99 located thereon. The coordinates of these defects 99 are stored in the computer 41. The movable inspection platform 11 is controllable by the computer 41 to move the semi-reflective film 91 in the X and Y directions, so as to sequentially move each of the defects 99 to each of the illuminating and imaging positions.

The P-polarized light source 21P and the S-polarized light source 21S are controlled by the computer 41 to illuminate the inspection surface 92 along the aforementioned optical axis A, and the direction of illumination is as described in the aforementioned step (A).

The camera module 31 is located on the normal of the inspection surface 92 of the semi-reflective film 91, and includes the P-polarization camera 31P and the S-polarization camera 31S, which are controlled by the computer 41 to take images of each of the defects 99 on the inspection surface 92 and obtain the aforementioned two captured images 37. The range of the camera module 31 is also described in step (B) above.

The computer 41 executes the evaluation logic 42 to determine the two captured images 37, and the evaluation logic 42 can be stored in the computer 41, and the contents are as described in the preceding step (C).

As discussed above, the aforementioned defect detection system 10 that illuminates the semi-reflective film along the same optical axis with different light sources can be used to perform the aforementioned method to determine whether the defect is located on the front or back surface of the film.

What is claimed is:

1. A defect detection method for illuminating a semi-reflective film using different light sources along a single optical axis, including the following steps:

preparing step (A) to prepare the semi-reflective film having an inspection surface to detect one or more defects of known coordinate positions in the semi-reflective film but unknown location as to locating on a front or back surface of the semi-reflective film by preparing a P-polarized light source and an S-polarized light source to illuminate the inspection surface along the optical axis, having an illumination angle between the optical axis and the inspection surface in a range of 5 and 45 degrees, and adjusting the illumination angle based on the surface reflectivity of the semi-reflective film so that a P-polarized light emitted by the P-polarized light source penetrates the inspection surface by over 30%, and an S-polarized light emitted by the S-polarized light source penetrates the inspection surface by less than 10%;

illuminating and imaging step (B) to sequentially illuminate and capture an image of the defects according to the coordinate positions using the P-polarized light source and S-polarized light source to illuminate the inspection surface, and using a camera module to capture one or more images for evaluation, with the camera module located on a normal line of the inspection surface of the semi-reflective film to cover the defects in a region according to the coordinate positions, wherein the captured images from the camera module are obtained based on the following conditions: when there are no defects on the front or back surface of the semi-reflective film, the P-polarized and S-polarized light as respectively emitted by the P-polarized source and the S-polarized light sources and reflected by the semi-reflective film will not enter the camera module; and detecting and determining step (C) to use a computer in executing an evaluation logic to determine the captured images having the defects, with the evaluation logic having the following rules: for a defect, if there is the S-polarized light entering the camera module in the captured images, then the defect is determined to be located on the front surface of the semi-reflective film, and if there is a P-polarized light but no S-polarized light entering the camera module in the captured images, then the defect is determined to be located on the back surface of the semi-reflective film.

2. The defect detection method for illuminating the semi-reflective film using the different light sources along the single optical axis according to claim 1, wherein in step (A), the illumination angle is 20 degrees; the P-polarized light penetrates the inspection surface by 50%, and the S-polarized light penetrates the inspection surface by 5%.

3. The defect detection method for illuminating the semi-reflective film with the different light sources along the single optical axis according to claim 1, wherein in step (B), the camera module includes a P-polarized camera and an S-polarized camera, and the P-polarized camera and the S-polarized camera capture one or more images of the semi-reflective film through the same optical axis.

4. The defect detection method for illuminating the semi-reflective film with the different light sources along the single optical axis according to claim 3, wherein in step (B), the P-polarized light is respectively emitted onto the inspection surface at the coordinate position of the defect using the P-polarized light source, and S-polarized light is emitted onto the inspection surface at the coordinate position of the defect using the S-polarized light source, and the captured images are obtained by using the P-polarized camera and the S-polarized camera respectively under illumination of the P-polarized light source and the S-polarized light source.

5. The defect detection method for illuminating the semi-reflective film with the different light sources along the single optical axis according to claim 1, wherein in step (B), the P-polarized light and the S-polarized light are simultaneously emitted onto the inspection surface at the coordinate position of the defect using the P-polarized light source and the S-polarized light source, respectively; and the P-polarized camera and the S-polarized camera are used to capture images simultaneously, and the P-polarized light and S-polarized light entering the camera module are separated by a filter module, such that when the P-polarized light and S-polarized light enter the camera module, the filter module separates the P-polarized light to the P-polarized camera and the S-polarized light to the S-polarized camera.

6. A defect detection system for illuminating a semi-reflective film using different light sources along a single optical axis, comprising:

a movable inspection platform for placing the semi-reflective film with an inspection surface, which has a plurality of defects located at coordinate positions on the semi-reflective film that have been stored in a computer, and the movable inspection platform can be controlled by the computer to move the semi-reflective film in the X and Y directions;

a P-polarized light source and an S-polarized light source, controlled by the computer to illuminate the inspection surface along the same optical axis and at an illumination angle of incidence of between 5 and 45 degrees, such that the optical axis is incident to the inspection surface, and the P-polarized light emitted by the P-polarized light source penetrates the inspection surface by more than 30%, while the S-polarized light emitted by the S-polarized light source penetrates the inspection surface by less than 10%; and a camera module located on a normal line of the inspection surface of the semi-reflective film and controlled by a computer for capturing one or more images corresponding to each of the defects on the inspection surface for evaluation, with the imaging range of the camera module covering only one of the defects at a time, and the camera module includes conditions as set forth below for the imaging range: when there are no defects located on the front or back surface of the semi-reflective film, the P-polarized light and S-polarized light from the illumination of the P-polarized and the S-polarized light sources as reflected by the semi-reflective film do not enter the camera module, wherein the computer executes an evaluation logic to determine the captured images, and for each of the defects, if the corresponding captured image has the S-polarized light entering the camera module, then the defect is determined to be located on the front surface of the semi-reflective film, and if the corresponding captured image for each of the defect has the P-polarized light but not the S-polarized light entering the camera module, then the corresponding defect is determined to be located on the back surface of the semi-reflective film.

7. The defect detection system for illuminating the semi-reflective film using different light sources along the single optical axis according to claim 6, wherein the P-polarized and S-polarized light sources are used to illuminate the semi-reflective film along the same optical axis, with the illumination angle set at 20 degrees so that the P-polarized light passes through the inspection surface at 50%, and the S-polarized light passes through the inspection surface at 5%.

8. The defect detection system for illuminating the semi-reflective film using different light sources along the single optical axis according to claim 6, wherein the camera module includes a P-polarized camera and an S-polarized camera, and the P-polarized camera and the S-polarized camera capture the images of the semi-reflective film through the same optical axis.

9. The defect detection system for illuminating the semi-reflective film using different light sources along the single optical axis according to claim 8, wherein the camera module comprises a filter module for separating the P-polarized and S-Polarized light entering the camera module by directing the P-polarized light entering the camera module to the P-polarized camera, and S-polarized light entering the camera module to the S-polarized camera.

* * * * *